United States Patent
Gerdts

(10) Patent No.: US 9,965,490 B2
(45) Date of Patent: May 8, 2018

(54) METHOD AND SYSTEM FOR CREATING A VIRTUAL FILE SYSTEM FROM A UNIFIED ARCHIVE

(71) Applicant: Oracle International Corporation, Redwood City, CA (US)

(72) Inventor: Michael Leroy Gerdts, Madison, WI (US)

(73) Assignee: Oracle International Corporation, Redwood City, CA (US)

( * ) Notice: Subject to any disclaimer, the term of this patent is extended or adjusted under 35 U.S.C. 154(b) by 444 days.

(21) Appl. No.: 13/955,661

(22) Filed: Jul. 31, 2013

(65) Prior Publication Data
US 2015/0040123 A1   Feb. 5, 2015

(51) Int. Cl.
*G06F 17/30* (2006.01)
*G06F 9/455* (2006.01)

(52) U.S. Cl.
CPC ............................ *G06F 17/30233* (2013.01)

(58) Field of Classification Search
None
See application file for complete search history.

(56) References Cited

U.S. PATENT DOCUMENTS

| | | | |
|---|---|---|---|
| 8,250,183 B1* | 8/2012 | Protassov et al. | 709/219 |
| 9,542,397 B1* | 1/2017 | Graham | G06F 17/3007 |
| 2010/0262585 A1* | 10/2010 | Rosikiewicz et al. | 707/679 |
| 2012/0174094 A1* | 7/2012 | LeMahieu et al. | 718/1 |
| 2014/0331226 A1* | 11/2014 | Arcese | G06F 9/45533 718/1 |

OTHER PUBLICATIONS

Mauro Arcese, "Reconfiguring a Snapshot of a Virtual Machine", Oct. 25, 2012, WIPO.*
Martin, B; Mounting archives with FUSE and archivemount; http://archive09.linux.com/feature/132196; Apr. 16, 2008 (3 pages).

* cited by examiner

*Primary Examiner* — Wynuel Aquino
(74) *Attorney, Agent, or Firm* — FBFK PC

(57) ABSTRACT

A method for creating a virtual environment (VE) in a non-global zone (NGZ) from a unified archive (UA). An instruction is received to create a VE within a NGZ of a global zone (GZ) using an image file of the VE located in the UA. The contents of the UA are accessible via a virtual file system (VFS) having an index. A directory of the VFS corresponding to guest data of the UA is identified. The guest data is associated with the NGZ and includes the image file. A copy of the index including only portions of the index corresponding to the guest data is created. A guest VFS is created within the NGZ based on the copy. The guest VFS makes only the contents of the UA corresponding to the guest data accessible. The image file is accessed using the guest VFS and used to create the VE.

20 Claims, 4 Drawing Sheets

METHOD AND SYSTEM FOR CREATING A VIRTUAL FILE SYSTEM FROM A UNIFIED ARCHIVE

BACKGROUND

Zone based virtualization offers the ability to share a system amongst many users in a resource efficient way. Methods of zone based virtualization in which a distinct virtual environment is used in each non-global zone are increasingly prevalent. If a distinct virtual environment in a customer non-global zone becomes non-functional the user may not be able to access the non-global zone remotely. Users may create back-up media to use to restore the virtual environment, and may be able to instruct the host system to restore the virtual environment within a non-global zone using the back-up media. Back-up media may include an image of the state of the virtual environment. Users may use a shared data structure to store the back-up media in a location accessible to the host system. Users may not want their back-up media to be accessible to other users of the system.

SUMMARY

In general, in one aspect, the invention relates to a method for creating a virtual environment (VE) in a non-global zone (NGZ) from a unified archive (UA). The method includes receiving an instruction to create a VE within a NGZ of a global zone (GZ) using an image file of the VE, where the image file is located in the UA, and where contents of the UA are accessible via a virtual file system (VFS) comprising an index. The method further includes identifying a directory of the VFS corresponding to guest data of the UA, where the guest data is associated with the NGZ and includes the image file, creating a copy of the index including only portions of the index corresponding to the guest data, and creating, based on the copy of the index, a guest VFS within the NGZ, where the guest VFS makes accessible only the contents of the UA corresponding to the guest data. The method further includes accessing the image file using the guest VFS and creating the VE from the image file.

In general, in one aspect, the invention relates to a system for creating a VE in a NGZ from a UA. The system includes a processor, a host GZ, executing on the processor, and including the NGZ, and the UA, where contents of the UA are accessible via a VFS including an index. The system further includes a zone manager, located in the host GZ, and including functionality to receive an instruction to create the VE within the NGZ using an image file of the VE, where the image file is located in the UA, access the image file using a guest VFS located within the NGZ, and create the VE from the image file. The system further includes a VFS daemon, located in the host GZ, and including functionality to identify a directory of the VFS corresponding to guest data of the UA, where the guest data is associated with the NGZ and includes the image file, create a copy of the index including only portions of the index corresponding to the guest data, and create, based on the copy of the index, the guest VFS within the NGZ, where the guest VFS makes accessible only the contents of the UA corresponding to the guest data.

In general, in one aspect, the invention relates to a non-transitory computer readable medium storing executable instructions. The executable instructions include functionality for receiving an instruction to create a VE within a NGZ of a global zone (GZ) using an image file of the VE, where the image file is located in the UA, and where contents of the UA are accessible via a virtual file system (VFS) comprising an index. The executable instructions further include functionality for identifying a directory of the VFS corresponding to guest data of the UA, where the guest data is associated with the NGZ and includes the image file, creating a copy of the index including only portions of the index corresponding to the guest data, and creating, based on the copy of the index, a guest VFS within the NGZ, where the guest VFS makes accessible only the contents of the UA corresponding to the guest data. The executable instructions further include functionality for accessing the image file using the guest VFS and creating the VE from the image file.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate a method and system for accessing the contents of a unified archive (UA), which stores data for multiple guest users of guest non-global zones (NGZs) within a host global zone (GZ). The guest users may be administrators of the guest NGZs and the UA may be a single file including data from many files and directories. Different sets of files and directories within the UA may be under the control of different guest users of NGZs. The data stored in the UA may include installation media, such as operating system images, for the virtual environments (VE) executed within the guest NGZs. The contents of the UA may be made accessible via a virtual file system (VFS), which may include an index that stores the location of different files and directories within the UA. The data specific to a particular guest user may be made accessible within a guest NGZ controlled by that guest user by presenting a portion of the VFS to the guest NGZ using a reduced subset of the index of the contents of the UA. In one embodiment of the invention, the guest NGZs may be kernel zones, with a distinct VE executing entirely within the scope of the guest NGZ and controlled by the user. In one embodiment of the invention, processes executing in the host GZ may include functionality to install a VE within the guest NGZ using the installation media stored within the UA.

Figure 1:
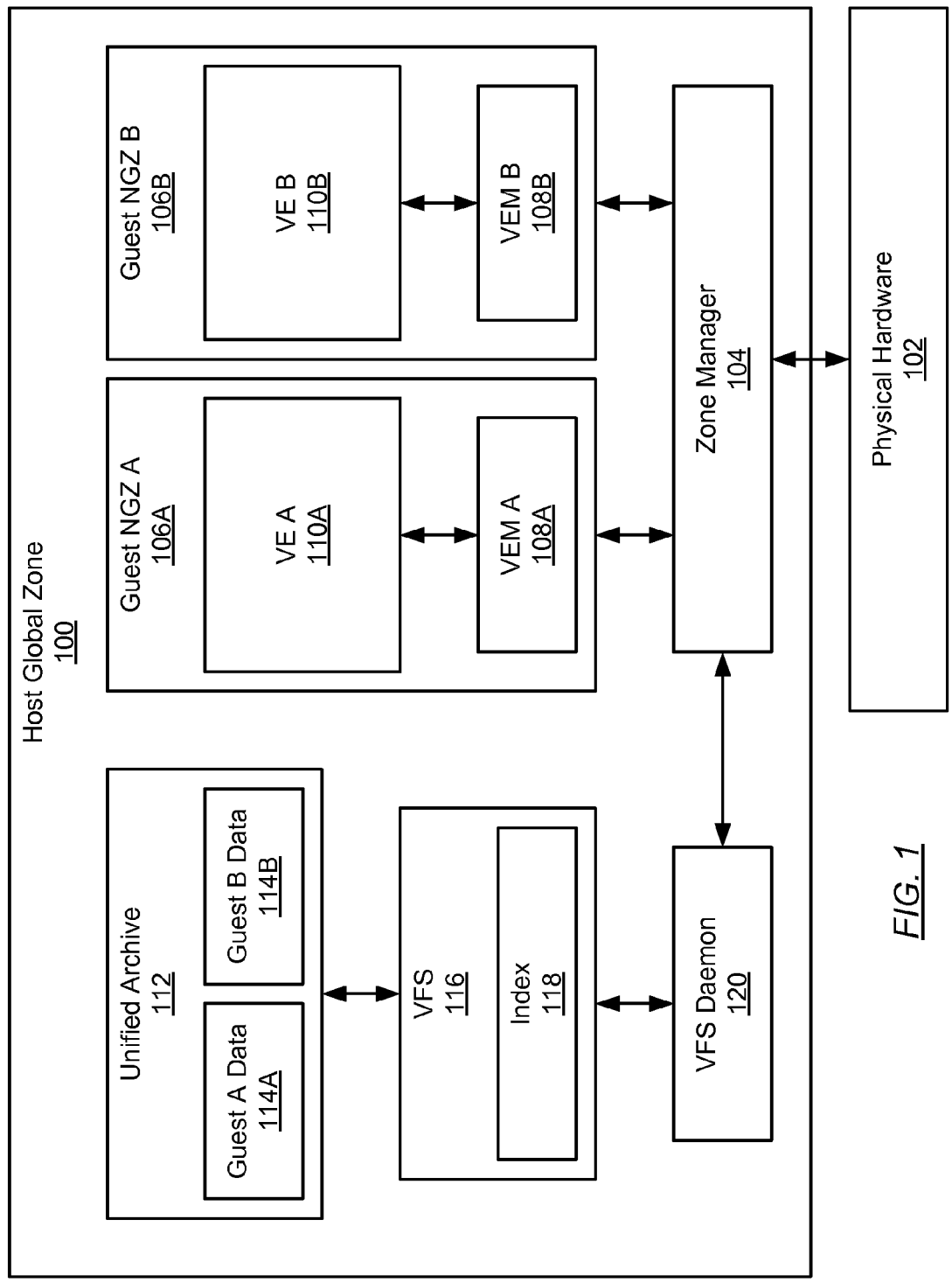
FIG. 1 shows a schematic diagram of a system in accordance with one embodiment of the invention.

FIG. 1 shows a schematic diagram of a system in accordance with one embodiment of the invention. The system includes a host GZ (100). The host GZ (100) may be a kernel-level program executing on physical hardware (102), or atop a layer of virtualized hardware. The host GZ (100) includes multiple guest NGZs (e.g. guest NGZ A (106A), guest NGZ B (106B)). The respective scopes of the guest NGZs (e.g., guest NGZ A (106A), guest NGZ B (106B)) are distinct, but fall within the scope of the host GZ (100). In one embodiment of the invention, the guest NGZs (e.g., guest NGZ A (106A), guest NGZ B (106B)) may share kernel-level processes with the host GZ (100). Alternately, each guest NGZ (e.g., guest NGZ A (106A), guest NGZ B (106B)) may only include a single virtual environment manager (VEM) process (e.g., VEM A (108A), VEM B (108B)) that includes functionality to manage and provide virtualized resources to a VE (e.g. VE A(110A), VE B (110B)), executing a distinct kernel, located within the scope of the guest NGZ (106A, 106B). Alternative forms of virtualization may be used in place of zones, such as Logical Domains, Xen, VMware, and other systems of creating and managing virtual machines.

In one embodiment of the invention, the host GZ (100) may include a unified archive (112) (UA). The UA (112) may be initially located within the host GZ (100), or may be downloaded from another source as needed. The UA (112) may be accessible via HTTP, HTTPSS, or other network protocols. In on embodiment of the invention, the UA (112) may not be downloaded to the host GZ (100); the UA (112) may be manipulated remotely to separate the data that is being made accessible to a specific guest NGZ (e.g. guest NGZ A (106A), guest NGZ B (106B)) and only the portions of the UA (112) which include the required data are transferred to the host GZ (100).

In one embodiment of the invention, the UA (112) may be used as to store back-up data from which to restore the VEs (110A, 110B) of the guest NGZs (e.g., guest NGZ A (106A), guest NGZ B (106B)). The data (e.g., guest A data (114A), guest B data (114B)) of the different guest NGZs (e.g., guest NGZ A (106A), guest NGZ B (106B)) may be stored within the UA (112). In one embodiment of the invention, the UA (112) may be accessed via a VFS (116) which includes an index (118) of the contents of the UA (112). The accessibility of the UA (112) and VFS (116) may be managed by a VFS daemon (120) located within the host GZ (100).

In one embodiment of the invention, the host GZ (100) is executing on physical hardware (102). The physical hardware (100) may include one or more processors, memory, storage (e.g., hard drive disks, solid state drives, flash drives, optical disks, magnetic tape, etc.), network adaptor(s), video adaptors, input/output devices (e.g. mice, keyboards, touch pads/screens, ports, CRT/LCD/LED displays). In one embodiment of the invention, the physical hardware (102) may include multiple distributed machines, servers, or network clusters, which may reside in multiple locations. The physical hardware (102) may be provided by third party, and accessed via one or more levels of abstraction. The host GZ (100) may execute directly on the physical hardware (102), or may execute atop one or more levels of virtualization.

In one embodiment of the invention, the host GZ (100) includes a zone manager (104), which is includes functionality to manage multiple guest non-global zones (NGZs) (e.g. guest NGZ A (106A), guest NGZ B (106B)). The zone manager (104) may execute directly on the physical hardware (102), in which case the zone manager (104) may also include functionality to manage the host GZ (100); alternatively, the zone manager (104) may be an application executing within the scope of the host GZ (100). In one embodiment of the invention, the zone manager (104) may include functionality to provide virtual hardware. The zone manager (104) may include functionality to create, destroy, and modify NGZs (e.g. guest NGZ A (106A), guest NGZ B (106B)). This functionality may include the ability to alter the scope and permissions of an NGZ (e.g. guest NGZ A (106A), guest NGZ B (106B)), install and uninstall software within an NGZ (e.g., guest NGZ A (106A), guest NGZ B (106B)), move objects into and out of the an NGZ (e.g., guest NGZ A (106A), guest NGZ B (106B)), and otherwise manipulate NGZs (e.g., guest NGZ A (106A), guest NGZ B (106B)).

In one embodiment of the invention, multiple guest NGZs (e.g., guest NGZ A (106A), guest NGZ B (106B)) are located within the scope of the host GZ (100). A guest NGZ (e.g., guest NGZ A (106A), guest NGZ B (106B)) may be a portion of the system of the host GZ (100) which is allocated to a specific guest user. A guest NGZ (e.g., guest NGZ A (106A), guest NGZ B (106B)) may include data and processes controlled by the guest user. Different subsets of the total number of guest NGZs (e.g., guest NGZ A (106A), guest NGZ B (106B)) may be controlled by different guest users.

The lowest level execution environment guest NGZ (e.g., guest NGZ A (106A), guest NGZ B (106B)) may be a portion of the execution environment of the host GZ (100) and basic kernel level processes may be shared between guest NGZs (e.g., guest NGZ A (106A), guest NGZ B (106B)) and the host GZ (100). A guest NGZ (e.g., guest NGZ A (106A), guest NGZ B (106B)) may be a designation applied to a collection of processes, data and locations within the host GZ (100) which specify that those processes, data and locations may be accessed within the guest NGZ (e.g., guest NGZ A (106A), guest NGZ B (106B)). Alternately, a specific set of resources may be allocated to each guest NGZ (e.g., guest NGZ A (106A), guest NGZ B (106B)). In one embodiment of the invention, resources of the host GZ (100) may be shared between some or all of the guest NGZs (e.g., guest NGZ A (106A), guest NGZ B (106B)). In one embodiment of the invention, there may be a file system (not shown) located within the host GZ (100). Different portions of the file system may be allocated to different guest NGZs (e.g., guest NGZ A (106A), guest NGZ B (106B)).

In one embodiment of the invention, a virtual environment manager (VEM) process (e.g., VEM A (108A), VEM B (108B)) is located within the scope of each of the guest NGZs (106A, 106B). A VEM (e.g., VEM A (108A), VEM B (108B)) may be the only process executing with the scope of the guest NGZ (e.g., guest NGZ A (106A), guest NGZ B (106B)). In one embodiment of the invention, the execution environment of the host GZ (100) may include functionality to directly host multiple VEs (e.g., VE A (110A), VE B (110B)). In one embodiment of the invention, the VEs (e.g., VE A (110A), VE B (110B)) may be specifically made to interact directly with a specific type of execution environment of the host GZ (100). In one embodiment of the invention, a single VEM (e.g., VEM A (108A), VEM B (108B)) may include functionality to simultaneously manage the VEs (e.g., VE A (110A), VE B (110B)) of multiple distinct guest NGZs (e.g., guest NGZ A (106A), guest NGZ B (106B)).

In one embodiment of the invention, the VEM (e.g. VEM A (108A), VEM B (108B)) may provide an abstracted subset of the physical hardware as a virtual machine within the scope of the guest NGZ (e.g. guest NGZ A (106A), guest NGZ B (106B)). The VEM (e.g. VEM A (108A), VEM B (108B)) may include functionality to manage, or provide virtualized resources for, one or more guest virtual environments (VEs) (e.g. guest A VE (110A), guest B VE (110B)). In one embodiment of the invention, a guest user associated with a guest NGZ (e.g., guest NGZ A (106A), guest NGZ B (106B)) may only be permitted to access the virtual hardware provided by the VEM (e.g., VEM A (108A), VEM B (108B)), and cannot directly access the shared execution environment of the host GZ (100).

In one embodiment of the invention, a VEM (e.g., VEM A (108A), VEM B (108B)) of a guest NGZ (e.g., guest NGZ A (106A), guest NGZ B (106B)) manages a VE (e.g., VE A (110A), VE B(110B)). A VE (e.g., VE A (110A), VE B(110B)) may be an operating system located within the scope of the respective guest NGZ (e.g., guest NGZ A (106A), guest NGZ B (106B)). In one embodiment of the invention, the VE (e.g., VE A (110A), VE B (110B)) may be any operating system that the guest user wants. Alternatively, the type and parameters of the VE (e.g., VE A (110A), VE B (110B)) may be specified or required by the VEM (e.g., VEM A (108A), VEM B (108B)) or host GZ (100). In one embodiment of the invention, the VE (e.g., VE A (110A), VE B (110B)) may interface with, or execute directly upon the execution environment of the host GZ (100).

In one embodiment of the invention, the operating system of the VE (e.g., VE A (110A), VE B (110B)) may be selected by the guest user, and the operation and details of the low level processes of the VE (e.g., VE A (110A), VE B(110B)) may be controlled directly by the guest user. Alternately, the VE (e.g., VE A (110A), VE B(110B)) may be managed by the host, and the guest user may only have access to the execution environment provided by the VE (e.g., VE A (110A), VE B(110B)). In one embodiment of the invention, an installation media file (not shown) which includes the configuration information of the installation of the VE (e.g. VE A (110A), VE B(110B)) may be located in the UA (112). The installation media file may be maintained by the guest user or by an administrative process located within the host GZ (100). Alternatively, or additionally, a state image file of the VE (e.g., VE A (110A), VE B (110B)) may be captured and stored in the UA (112). The VE (e.g. VE A (110A), VE B (110B)) may be restored using the installation media file or the state image by extracting the contents of the state image file directly into the guest NGZ (e.g., guest NGZ A (106A), guest NGZ B (106B)).

In one embodiment of the invention, a unified archive (UA) (112) is located within the scope of the host GZ (100). Alternatively, or additionally, a copy of the UA (112) may be stored in a location that is remote to the host GZ (100) or the physical hardware (102). As discussed above, the UA (112) may be based upon or arranged in the same way as a file system. In one embodiment of the invention, the UA (112) may be periodically updated to reflect changes in the states of the guest NGZ (e.g., guest NGZ A (106A), guest NGZ B (106B)). The changes may be based upon changes to the contents of the file system which was used to create the UA (112). The data of the UA (112) may be stored in such a way that individual files and directories are not distinctly separated or addressed. The data which is stored within the UA (112) may be compressed and/or encrypted. In one embodiment of the invention, the UA (112) might be an Open Virtualization Archive (OVA) package. In one embodiment of the invention, the UA may include one or ore data stream files created based upon one or more file systems. For example, a stream in the UA (112) might be a ZFS stream created using a ZFS file system. Alternatively, the stream might be a TAR, CPIO, or PAX archive created from any file system type. In one embodiment of the invention, the UA may include disk images. In one embodiment of the invention, the UA may include multiple archive and/or disk image types. In one embodiment of the invention some sections or segments of the UA (112) may be individually accessible.

In one embodiment of the invention, the UA (112) includes guest data (e.g., guest A data (114A), guest B data (114B)) associated with one or more guest users. The guest data (e.g., guest A data (114A), guest B data (114B)) may be associated with a specific guest NGZ (e.g., guest NGZ A (106A), guest NGZ B (106B)), and/or may be associated with an alternative identification of the guest user. In one embodiment of the invention, the guest data (e.g., guest A data (114A), guest B data (114B)) associated with a specific guest user is stored in a distinct portion of the UA (112). Alternatively, guest data (e.g., guest A data (114A), guest B data (114B)) may be arranged according to a compression algorithm, type of the data, date of creation, location within the SFS, or other factor. In one embodiment of the invention, the guest data (e.g., guest A data (114A), guest B data (114B)) for each guest user may be individually accessible. The guest data (e.g., guest A data (114A), guest B data (114B)) of different guest users may be differentiated using an offset or address associated with the guest data (e.g., guest A data (114A), guest B data (114B)). The location and access information of the guest data (e.g., guest A data (114A), guest B data (114B)) may be stored in an index (118).

In one embodiment of the invention, the contents of the guest data (e.g., guest A data (114A), guest B data (114B)) may be controlled, managed, and updated by the guest user. Alternatively, processes within the host GZ (100), or another entity in which the UA (112) is located, may keep all or some of the guest data (e.g., guest A data (114A), guest B data (114B)) within the UA (112) up-to-date. In one embodiment of the invention, the guest data (e.g., guest A data (114A), guest B data (114B)) may be static. The guest data (e.g., guest A data (114A), guest B data (114B)) may be back-up data for the VEs (e.g., VE A (110A), VE B (110B)) and other data located within the guest NGZs (e.g., guest NGZ A (106A), guest NGZ B (106B)) of the host system. In one embodiment of the invention, the UA (112) may include multiple versions of the guest data (e.g., guest A data (114A), guest B data (114B), which correspond to the state of the guest NGZ (e.g., guest NGZ A (106A), guest NGZ B (106B)) at different times.

In one embodiment of the invention, guest data (e.g., guest A data (114A), guest B data (114B)) associated with a particular guest NGZ (e.g., guest NGZ A (106A), guest NGZ B (106B)) may include one or more files or file hierarchies which include installation media for the VE (e.g., VE A (110A), VE B (110B)) of that guest NGZ (e.g., guest NGZ A (106A), guest NGZ B (106B)). The guest data (e.g., guest A data (114A), guest B data (114B)) may be arranged in a manner that enables it to be mounted. Further, the guest data may include files that may be used in the boot process for the VE with which it is associated. In one embodiment of the invention, the guest data (e.g., guest A data (114A), guest B data (114B)) may be a state image of a VE (e.g., VE A (110A), VE B (110B)) the contents and organization of which conforms to the open virtualization format (OVF). The installation media or state image may be mounted within the guest NGZ (e.g., guest NGZ A (106A), guest NGZ B (106B)), and booted or extracted in order to restore the VE (e.g., VE A (110A), VE B (110B)) of the guest NGZ (e.g., guest NGZ A (106A), guest NGZ B (106B)) to a previous state.

In one embodiment of the invention, the guest data (e.g., guest A data (114A), guest B data (114B)) within the UA (112) is made accessible using a VFS (116). The VFS (116) may include functionality to appear to a file manager within the host GZ (100) as a directory or hierarchy of directories which holds an extracted copy of some or all of the guest data (e.g., guest A data (114A), guest B data (114B)) stored within the UA (112). In one embodiment of the invention, the VFS (116) may be appear as one or more directories within the SFS. In one embodiment of the invention, a reduced subset (not shown) of the VFS (116) may be created within the scope of a guest NGZ (e.g., guest NGZ A (106A), guest NGZ B (106B)). The reduced subset of the VFS (116) may only include access to portion of the UA (112) which stores the guest data (e.g., guest A data (114A), guest B data (114B) associated with the guest NGZ (e.g., guest NGZ A (106A), guest NGZ B (106B)) in which the reduced subset is located. In one embodiment of the invention, rather accessing the actual UA (112), the reduced subset may only have access to a virtual copy of the UA (112) also located within the scope of the guest NGZ (e.g., guest NGZ A (106A), guest NGZ B (106B)).

In one embodiment of the invention, the VFS (116) includes an index (118). The index (118) may include the location of the sub-archives (e.g., sub-archive A (114A), sub-archive B (114B)) within the UA (112). The index (118) may also include the location of specific files and directories within the UA (112). In one embodiment of the invention, the guest VFS is created by modifying the index (118) of the VFS (116) to obtain a reduced index which only includes locations of data relevant to the guest NGZ (e.g., guest NGZ A (106A), guest NGZ B (106B)). The VFS (116) may not present the guest data (e.g., guest A data (114A), guest B data (114B)) as it is stored within the UA (112). In one embodiment of the invention, the UA (112) may be an OVA, the guest data (e.g., guest A data (114A), guest B data (114B)) may conform to the OVF standard, and the index (118) may be an OVF descriptor file. In one embodiment of the invention the OVF descriptor may further include functionality to access the guest data (e.g., guest A data (114A), guest B data (114B)) and present it within a VFS (116) hierarchy conforming to the OVF standard.

In one embodiment of the invention, a VFS daemon (120) is located within the scope of the host GZ (100). The VFS daemon (120) may include functionality create and mount a virtual copy of UA (112) or a virtual copy of a subset of the UA (112) within the scope of the guest NGZ (e.g., guest NGZ A (106A), guest NGZ B (106B)). Upon mounting the virtual copy of the UA (112) within the scope of the guest NGZ (e.g., guest NGZ A (106A), guest NGZ B (106B)), the VFS daemon (120) may further include functionality to create a modified version of the index (118), and to create a guest VFS within the scope of the guest NGZ (e.g., guest NGZ A (106A), guest NGZ B (106B)) makes a subset of the guest data (e.g., guest A data (114A), guest B data (114B)) stored within the UA (112) accessible within the scope of the guest NGZ (e.g., guest NGZ A (106A), guest NGZ B (106B)).

The invention is not limited to the system shown in FIG. 1.

Figure 2:
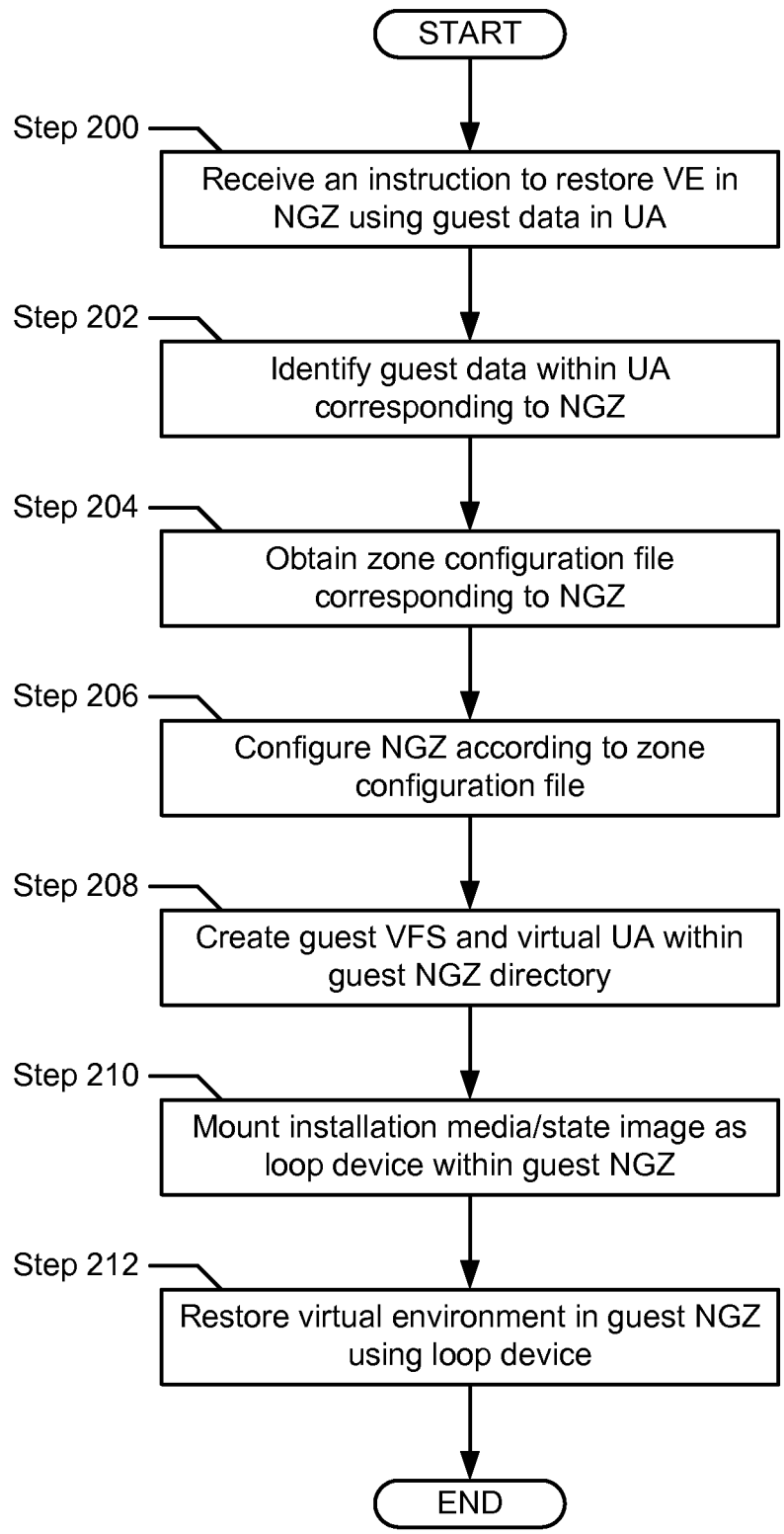
FIG. 2 shows a flowchart for creating a virtual environment in a non-global zone in accordance with one embodiment of the invention.

FIG. 2 shows a flowchart for restoring a VE in the NGZ using guest data stored within a UA in accordance with one embodiment of the invention. While various steps in the flowchart are presented and described sequentially, one of ordinary skill will appreciate that some or all of the steps may be executed in different orders, may be combined or omitted, and some or all of the steps may be executed in parallel.

In Step 200, an instruction to restore a VE within the guest NGZ is received. The instruction may be received from a guest user with access permission to the guest NGZ. The instruction may be received directly from the guest user via a network connection of the host GZ. Alternatively, or additionally, the instruction may need to be entered or approved by an administrator of the host global zone. In one embodiment of the invention, the instruction may specify a location of a UA or a location within a UA in which the guest data is located. The instruction may also include details on the composition of the guest data. In one embodiment of the invention, a zone manager located in the host GZ may make a determination that VEs must be restored within one or more guest NGZs located within the host GZ. Each of the guest NGZs may execute a different VE, as a result restoring the VE of each guest NGZ may require obtaining different guest data from different portions of the same UA by different guest NGZs.

In Step 202, the guest data of the UA which is associated with the guest NGZ in which the VE is being restored is identified. In one embodiment of the invention, the appropriate UA may need to be located prior to the access to the UA. Further, in one embodiment of the invention, the UA may need to be retrieved from an external location. In one embodiment of the invention, the guest NGZ may be associated with a specific portion of the data located within a UA; and data may further be located within multiple UAs. Additionally, redundant data, or different versions of the same data may be stored within a single UA. The specific location and version of the data to be used to restore the VE of the guest NGZ may need to be determined. A guest user may specify this information in the instruction. Alternatively, instructions and details for restoring a VE within a guest NGZ may be maintained by the host.

In Step 204, a zone configuration file is obtained. The zone configuration file may be obtained directly from the guest user in the instruction. Alternatively, the zone configuration file may be stored within the guest data associated with the guest NGZ. Retrieving the zone configuration file may be dictated by automatic instructions followed by the host to restore a VE within a guest NGZ. The zone configuration file may be retrieved from an external source specified by the guest user such as a website or online repository, from a location within the host system, or the zone configuration file may be obtained directly from the guest user.

In Step 206, the guest NGZ in which the VE is being installed is configured according to the zone configuration file. The configuration of the guest NGZ may include identifying appropriate scripts to handle the configuration and installation. The configuration of the guest NGZ may further include the configuration of resources accessible within the guest NGZ. This may include, for example, formatting the storage available within the guest NGZ, creating and designating of a zonepath directories and root volumes, generating or modifying system configuration files, creating loop devices or other constructs required to mount the installation media, and initializing other settings within the guest NGZ.

In Step 208, a guest VFS is created within the guest NGZ. The guest VFS may be created based upon the portions of the index of a main VFS which includes details of the locations of all of the guest data within the UA. The guest VFS may include only the locations of the guest data within the UA which is associated with the guest NGZ. In one embodiment of the invention, a virtual UA comprising a reference to the actual UA in the host GZ scope may be created within the scope of the guest NGZ. In one embodiment of the invention, the creation of the guest VFS may be performed by a VFS daemon located in the host GZ. The creation of the guest VFS is discussed in greater detail in the description of FIG. 3 below.

In Step 210, an installation media file or state image of the VE is mounted as a loop device within the NGZ. Mounting the installation media or state image may include setting the loop device to access the virtual copy of the installation media or state image located within the guest VFS in the guest NGZ. When the installation media or state image has been mounted the loop device may make the contents of the installation media file accessible same as if a the apparent contents of the guest VFS were stored on a physical device had been connected to the guest NGZ. In one embodiment of the invention, there may be multiple installation media files within the UA. Multiple loop devices may be used to mount the multiple installation files. The multiple installation files may be mounted simultaneously, serially, or as needed.

In Step 212, the virtual environment is restored on the guest NGZ by booting from the loop device. As discussed above, the contents, such as image files, of the guest VFS may be mounted as loop devices to be made accessible as an entire file system located on a physical device connected to the guest NGZ. In addition to the pseudo file system presented by the loop device, the installation media may include a boot loader. When accessed, the boot loader may automatically boot the execution environment or operating system stored within the installation media. If an installation media file is being used to restore the VE, the boot loader may present a user with an option to install the environment located with in the installation media into the guest NGZ. The boot loader may alternately allow the user to run the execution environment directly off of the installation media. In one embodiment of the invention, the execution environment of the installation media may automatically be installed into the guest NGZ when the loop device is accessed. In one embodiment of the invention, rather than installing the execution environment directly from the installation media, the loop device may simply present a live environment within the guest NGZ which the guest user is capable of accessing remotely.

If the VE of the guest NGZ is being restored from a state image file, the contents of the state image file may simply be extracted directly into the guest NGZ and executed. In one embodiment of the invention, an existing state of the VE within the guest NGZ may be modified to match the state stored within the state image file.

Figure 3:
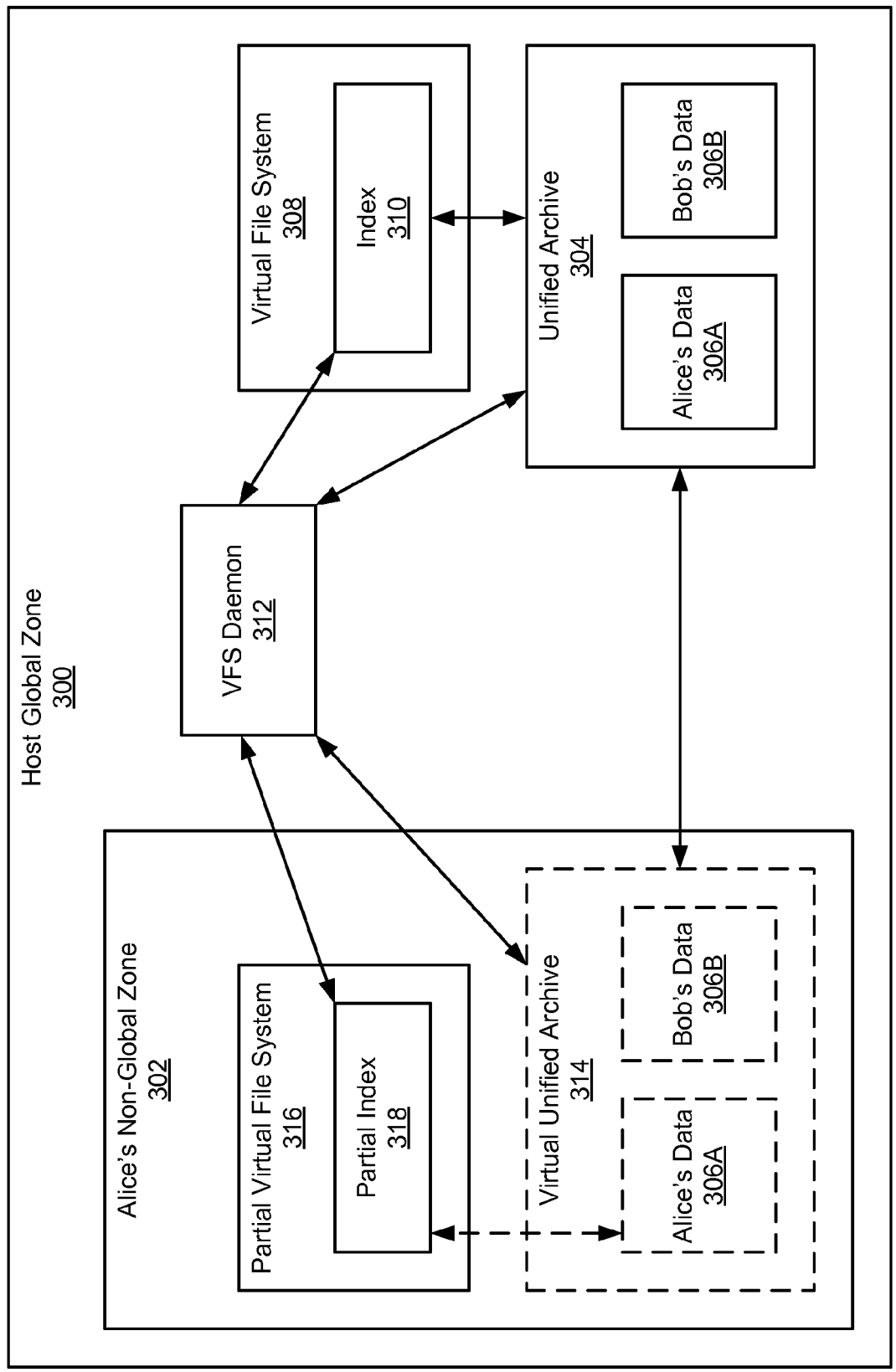
FIG. 3 shows an example for creating a virtual environment in a non-global zone in accordance with one embodiment of the invention.

FIG. 3 shows an example of a portion of the data in a unified archive (304) being made available within a non-global zone in accordance with one embodiment of the invention. This example is included for explanatory purposes only, and is not intended to limit the scope of the invention.

Alice and Bob run competing web services; however, they have both obtained remote computing space on a single server at the local data center. The server uses a kernel zone based virtualization scheme to allocate resources between the two of them. Ordinarily, this poses no problem; however, the server stores back up installation media for Alice and Bob's respective non-global zones in a single unified archive (304). As both Alice and Bob would prefer that the other not have access to their configuration data (e.g. Alice's Data (306A), Bob's Data (306B)) a solution must be found to allow each to access the unified archive (304), without compromising the privacy of the other's data within the unified archive (304).

Within the host GZ (300) of the server, the entire contents of the unified archive (304) is made available as an virtual file system (308). The virtual file system (308) includes an index (310) which stores offsets used to identify various directories and files stored within the unified archive (308). Obviously, if Alice wishes to access her data (306A), she cannot be given access to the virtual file system (308) as it exists within the host global zone (300), as she would then also have access to Bob's Data (306B).

To sanitize the version of the unified archive (304) accessible to Alice, a VFS daemon (312) executing in the host global zone (300) creates a virtual copy of the unified archive (314) and mounts it within the scope of Alice's non-global zone (302). The virtual unified archive (314) comprises a reference to the unified archive (304), allowing processes within Alice's non-global zone (302) to interact with the unified archive (304), without providing access to the contents of the unified archive (304).

The VFS daemon (312) next identifies the portion (s) of the unified archive (304) in which Alice's data (303A) is stored. The VFS daemon (312) creates a partial index (318) by stripping the location of Bob's data (306B) out of the index (310). The VFS (312) daemon then creates an partial virtual file system (316) using the partial index (318). The partial virtual file system (316) is created within the scope of Alice's NGZ (302), and because the partial index (318) includes only the location of Alice's data (306A) within the unified archive (304), makes Alice's data (306A) accessible while protecting Bob's data (306B). If Bob wanted to access his data (306B) which was stored in the unified archive (304), the process could simply be reversed, with the location information on Alice's data (306A) being removed from the index (310), and used to create a partial virtual file system (516) within Bob's NGZ (not shown).

Figure 4:
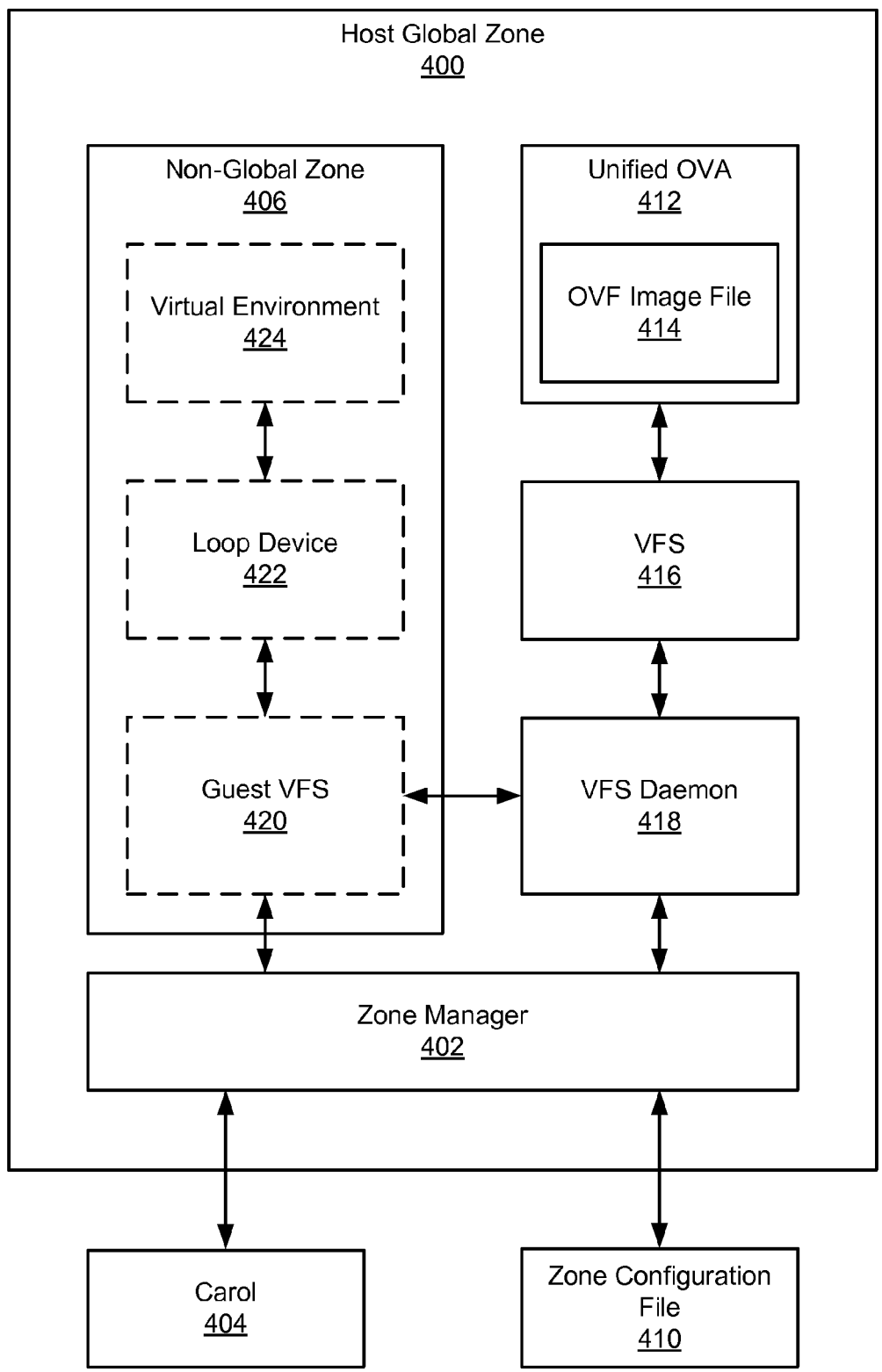
FIG. 4 shows an example for creating a virtual file system based on a unified archive in accordance with one embodiment of the invention.

FIG. 4 shows an example of a unified archive being used to restore a virtual environment within a guest NGZ in accordance with one embodiment of the invention. This example is included for explanatory purposes only and is not intended to limit the scope of the invention. Further, various components of the system have been omitted for purposes of clarity in FIG. 4

Carol (404) also rents server space at the local data center (i.e., the local data center in FIG. 3). Carol (404) maintains a virtual environment within a NGZ (406) within a host GZ (400) on a server at the data center. However, one night while Carol (404) is remotely updating the virtual environment (424), her connection is unexpectedly severed, leaving the virtual environment (424) in an unbootable state. As Carol (404) cannot connect directly to the NGZ (406) with no virtual environment (424) executing within, she is unable to directly reinstall the virtual environment (424). Fortunately, the data center offers a zone restore system.

Carol (404) connects to the zone manager (402) of the host GZ (400) and instructs it to create an NGZ (406) based upon parameters defined by a zone configuration file (410), for which Carol (404) has provided a location. The zone configuration file (410) specified by Carol (404) includes the resources allocated to the previous NGZ (406), the type of VE (424) which will be created within the NGZ (406), and other basic details. The resources may include an amount of storage, a specific quantity of processing capacity, a network address of the zone, and details on other resources which may be necessary to ensure the proper functioning of the VE (424) and the ability of the Carol (404) to access the NGZ (406). Carol (404) may also instruct the zone manager (402) to delete the previous NGZ (406). The new NGZ (406) is created with appropriate settings, data structures, and access to resources. Carol (404) further instructs the zone manager (402) to create a specific virtual environment (424) within the NGZ (406) using an OVF image file (414) located in a unified OVA (412) which stores OVF image files (414) for every guest user who maintains NGZs (406) in the host GZ (400).

After creating the new NGZ (406), the zone manager (402) instructs the VFS daemon (418) located in the host GZ (400) to make the appropriate OVF image file (414) stored within the unified OVA (412) accessible within the NGZ (406). The contents of the unified OVA (412) are accessible to processes within the host GZ (400) via a VFS (416). The VFS daemon (418) includes functionality to examine, manipulate and modify the unified OVA (412) and VFS (416), and to create virtual copies of the unified OVA (412) and VFS (416) within the scope of the NGZ (406). The VFS daemon (418) creates a virtual copy of the unified OVA (412) within the scope of the NGZ (406). The virtual copy of the unified OVA (412) is a reference to the unified OVA (412) in the host GZ (100) scope; however, the presence of the presence of the virtual copy allows access to the contents of the Unified OVA (414) from within the scope of the NGZ (406). Next the VFS daemon (418) identifies an index of the contents of the UA (412) which was used by the VFS (416) to access the data. The VFS daemon (418) identifies the portion index associated with the unified OVA (412) in which the OVF image file (414) is located. The VFS daemon (416) creates within the scope of the NGZ (406) a guest VFS (420). The guest VFS (420) includes functionality to access the virtual copy of the unified OVA (412). Further, the guest VFS (420) includes a stripped down index which includes only the location within the unified OVA (412) of the OVF image file (414) being used to create the VE (424) within the NGZ (406). Accordingly, within the scope of the NGZ, only the contents of the unified OVA (412) associated with the NGZ (406) are accessible.

After the guest VFS (420) has been created within the NGZ (406), the zone manager (402) creates a loop device (422) within the NGZ (406). The OVF image file (414) is then accessed via the guest VFS (420) and mounted using the loop device as a bootable drive. The bootable drive of the OVF image file (414) is then instructed by the zone manager (402) to create the VE (424) within the NGZ (406) using the (apparently) available resources. Creating the VE (424) may include extracting the state of the VE (424) into the NGZ (406). At this point, the new NGZ (406) should be identical to the previous NGZ (406) at the point when the last back-up of the state of VE (424) was created and added to the unified OVA (412).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a virtual environment (VE) in a non-global zone (NGZ) from a unified archive (UA), comprising:
   creating, based on receiving an instruction, a VE within a first NGZ of a global zone (GZ) using an image file of the VE, wherein the image file is located in the UA, and wherein contents of the UA are accessible via a virtual file system (VFS) comprising a VFS index;
   identifying a directory of the VFS corresponding to first guest data of a plurality of guest data of the UA, wherein the first guest data is associated with the first NGZ and comprises the image file;
   creating a partial index having portions of the VFS index corresponding to the first guest data by removing, from the VFS index, a location of second guest data of the plurality of guest data, wherein the second guest data is associated with a second NGZ of the GZ;
   creating, based on the partial index, a guest VFS within the first NGZ, wherein the guest VFS makes accessible only the contents of the UA corresponding to the first guest data;
   accessing the image file using the guest VFS; and creating the VE within the first NGZ from the accessed image file.

2. The method of claim 1, further comprising:
   obtaining a zone configuration file; and
   configuring, prior to creating the VE, the first NGZ according to the zone configuration file.

3. The method of claim 1, further comprising:
   mounting, within the first NGZ, the image file as a loop device.

4. The method of claim 1,
   wherein the UA comprises a plurality of portions corresponding to different guests, and
   wherein each of the plurality of portions comprises the guest data of the plurality of guest data associated with a particular NGZ of the GZ.

5. The method of claim 1,
   wherein the UA comprises a plurality of stream files,
   wherein the VFS index comprises locations of the plurality of stream files within the UA, and
   wherein the guest VFS is created from a subset of the plurality of the stream files corresponding to the first NGZ.

6. The method of claim 1, wherein the image file is configured according to the open virtualization format (OVF) and wherein the UA is an open virtualization archive (OVA).

7. The method of claim 1 wherein the image file comprises an image of a state of the VE, and wherein creating the VE comprises extracting the state of the VE into the first NGZ.

8. A system for creating a VE in a first NGZ from a UA, comprising: a processor;

a host GZ, executing on the processor, and comprising the first NGZ and a second NGZ; the UA, wherein contents of the UA are accessible via a VFS comprising a VFS index;
a zone manager, located in the host GZ, and configured to:
create, based on receiving an instruction, the VE within the first NGZ using an image file of the VE, wherein the image file is located in the UA;
access the image file using a guest VFS located within the first NGZ; and create the VE within the first NGZ from the accessed image file;
a VFS daemon, located in the host GZ, and configured to:
identify a directory of the VFS corresponding to first guest data of a plurality of guest data of the UA, wherein the first guest data is associated with the first NGZ and comprises the image file;
create a partial index comprising only portions of the VFS index corresponding to the first guest data by removing, from the VFS index, a location of second guest data of the plurality of guest data, wherein the second guest data is associated with the second NGZ; and
create, based on the partial index, the guest VFS within the first NGZ, wherein the guest VFS makes accessible only the contents of the UA corresponding to the first guest data.

9. The system of claim 8, wherein the zone manager is further configured to:
obtain a zone configuration file stored; and
configure, prior to creating the VE, the first NGZ according to the zone configuration file.

10. The system of claim 8, wherein the zone manager is further configured to mount, the image file as a loop device, wherein the loop device is made accessible within the first NGZ.

11. The system of claim 8,
wherein the UA comprises a plurality of portions corresponding to different guests, and
wherein each of the plurality of portions comprises the guest data of the plurality of guest data associated with a particular NGZ of the GZ.

12. The system of claim 8,
wherein the UA comprises a plurality of stream files,
wherein the VFS index comprises locations of the plurality of stream files within the UA, and
wherein the guest VFS is created from a subset of the plurality of stream files corresponding to the first NGZ.

13. The system of claim 8, wherein the image file is configured according to the open virtualization format (OVF) and wherein the UA is an open virtualization archive (OVA).

14. The system of claim 8, wherein the image file comprises an image of a state of the VE, and wherein creating the VE comprises extracting the state of the VE into the first NGZ.

15. A non-transitory computer readable medium comprising executable instructions for:

creating, based on receiving an instruction, a virtual environment (VE) within a first non-global zone (NGZ) of a global zone (GZ) using an image file of the VE, wherein the image file is located in a UA, and wherein contents of the UA are accessible via a virtual file system (VFS) comprising a VFS index;
identifying a directory of the VFS corresponding to first guest data of a plurality of guest data of the UA, wherein the first guest data is associated with the first NGZ and comprises the image file;
creating a partial index comprising only portions of the VFS index corresponding to the first guest data by removing, from the VFS index, a location of second guest data of the plurality of guest data, wherein the second guest data is associated with a second NGZ of the GZ;
creating, based on the partial index, a guest VFS within the first NGZ, wherein the guest VFS makes accessible only the contents of the UA corresponding to the first guest data;
accessing the image file using the guest VFS; and
creating the VE within the first NGZ from the accessed image file.

16. The non-transitory computer readable medium of claim 15, further comprising computer executable instructions for:
obtaining a zone configuration file; and
configuring, prior to creating the VE, the first NGZ according to the zone configuration file.

17. The non-transitory computer readable medium of claim 15, further comprising computer executable instructions for mounting, within the first NGZ, the image file as a loop device.

18. The non-transitory computer readable medium of claim 15,
wherein the UA comprises a plurality of portions corresponding to different guests, and
wherein each of the plurality of portions comprises the guest data of the plurality of guest data associated with a particular NGZ of the GZ.

19. The non-transitory computer readable medium of claim 15,
wherein the UA comprises a plurality of stream files,
wherein the VFS index comprises locations of the plurality of stream files within the UA, and
wherein the guest VFS is created from a subset of the plurality of stream files corresponding to the first NGZ.

20. The non-transitory computer readable medium of claim 15,
wherein the image file comprises an image of a state of the VE,
wherein creating the VE comprises extracting the state of the VE into the first NGZ,
wherein the image file is configured according to the open virtualization format (OVF), and
wherein the UA is an open virtualization archive (OVA).

* * * * *